(12) United States Patent
Kim et al.

(10) Patent No.: US 9,383,815 B2
(45) Date of Patent: Jul. 5, 2016

(54) MOBILE TERMINAL AND METHOD OF CONTROLLING THE MOBILE TERMINAL

(71) Applicant: LG ELECTRONICS INC., Seoul (KR)

(72) Inventors: Jonghwan Kim, Seoul (KR); Minkyeong Kim, Seoul (KR); Kyungjin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 13/945,809

(22) Filed: Jul. 18, 2013

(65) Prior Publication Data
US 2014/0136953 A1 May 15, 2014

(30) Foreign Application Priority Data
Nov. 13, 2012 (KR) .......................... 10-2012-0128355

(51) Int. Cl.
*G06F 17/22* (2006.01)
*G06F 3/01* (2006.01)
*G06F 9/54* (2006.01)

(52) U.S. Cl.
CPC ............ *G06F 3/01* (2013.01); *G06F 9/542* (2013.01); *G06F 17/2247* (2013.01)

(58) Field of Classification Search
CPC .................................................. G06F 17/2247
USPC .......................................................... 715/234
See application file for complete search history.

(56) References Cited

U.S. PATENT DOCUMENTS

| 7,953,730 | B1* | 5/2011 | Bleckner | G06F 17/30864 707/722 |
| 2002/0033846 | A1* | 3/2002 | Balasubramanian | G06F 17/30876 715/764 |
| 2003/0206200 | A1* | 11/2003 | Hejl | G06Q 10/107 715/810 |
| 2005/0094779 | A1* | 5/2005 | Kleinfelter | H04M 3/537 379/88.12 |
| 2005/0240576 | A1* | 10/2005 | Piscitello | G06F 17/30657 |
| 2006/0277478 | A1* | 12/2006 | Seraji | G06F 3/0481 715/760 |
| 2007/0033269 | A1* | 2/2007 | Atkinson | G06Q 10/10 709/219 |

(Continued)

FOREIGN PATENT DOCUMENTS

CN 102404447 4/2012

OTHER PUBLICATIONS

Heinzl, Steffen, Markus Mathes, Thilo Stadelmann, Dominik Seiler, Marcel Diegelmann, Helmut Dohmann, and Bernd Freisleben. "The web service browser: Automatic client generation and efficient data transfer for web services." In Web Services, 2009. ICWS 2009. IEEE International Conference on, pp. 743-750. IEEE, 2009.*

(Continued)

*Primary Examiner* — Frank D Mills
(74) *Attorney, Agent, or Firm* — Lee, Hong, Degerman, Kang & Waimey; Jonathan Kang; Harry Lee

(57) ABSTRACT

The present invention relates to a mobile terminal that is capable of executing a multitasking function, and a method of controlling the mobile terminal. According to an aspect of the present invention, there is provided a mobile terminal includes a display unit on which an address input window including address information on a web page is displayed, along with the web page, and a controller that monitors an event that occurs, and that controls the address input window in such a manner that the address input window is used in executing a function associated with the event that occurs, depending on whether or not the event occurs.

20 Claims, 17 Drawing Sheets

(56) References Cited

U.S. PATENT DOCUMENTS

| | | | |
|---|---|---|---|
| 2008/0016143 A1* | 1/2008 | Bumpus | H04L 41/0226 709/203 |
| 2008/0040436 A1* | 2/2008 | Setlur | G06Q 10/107 709/206 |
| 2008/0082821 A1* | 4/2008 | Pritikin | G06F 17/243 713/169 |
| 2008/0189654 A1* | 8/2008 | Thomas | G06F 17/30867 715/805 |
| 2011/0083097 A1* | 4/2011 | Miner | G06F 3/04842 715/780 |
| 2011/0214084 A1* | 9/2011 | Kim | G06F 3/04886 715/780 |
| 2012/0136756 A1* | 5/2012 | Jitkoff | G06Q 30/0641 705/27.1 |
| 2012/0192089 A1* | 7/2012 | Kim | G06F 17/30864 715/760 |
| 2012/0192096 A1* | 7/2012 | Bowman | G06F 3/0481 715/780 |
| 2013/0024779 A1* | 1/2013 | Bechtel | G06F 3/04842 715/752 |
| 2013/0159271 A1* | 6/2013 | Ophir | G06F 17/30867 707/706 |

OTHER PUBLICATIONS

The State Intellectual Property Office of the People's Republic of China Application Serial No. 201310388677.2, Office Action dated Dec. 16, 2015, 9 pages.

\* cited by examiner

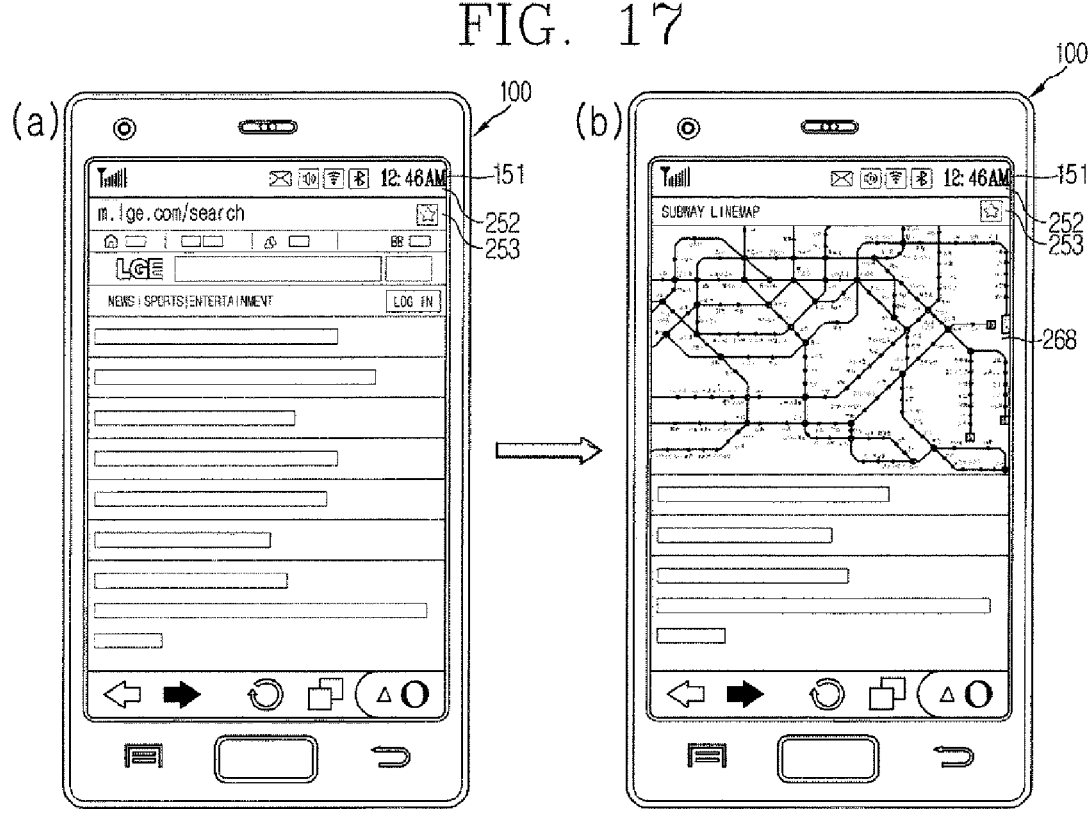

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0128355, filed on Nov. 13, 2012, the contents of which is incorporated by reference herein in its entirety.

BACKGROUND OF THE DISCLOSURE

1. Field of the Disclosure

The present invention relates to a mobile terminal, and more particularly to a mobile terminal that is capable of executing a multitasking function and a method of controlling the mobile terminal.

2. Background of the Disclosure

Terminals can be divided into mobile/portable terminals and stationary terminals according to their mobility. The portable terminals can be divided into handheld terminals and vehicle mount terminals according to whether a user directly carries his or her terminal.

As such a mobile terminal becomes multifunctional, the mobile terminal can be allowed to capture still images or moving images, play music or video files, play games, receive broadcast, etc., so as to be implemented as an integrated multimedia player. In order to support and enhance such functions of the terminal, it can be considered to improve configuration and/or software of the terminal.

On the other hand, the mobile terminal can execute a multitasking function.

Multitasking means the capability of the mobile terminal to execute multiple applications concurrently.

For example, the mobile terminal executes a message application in the background while displaying a web page in the foreground.

However, if an event occurs in the background with the web page being displayed in the foreground, a user experiences the convenience of having to abandon viewing some part of the web page displayed in the foreground that is veiled to display information associated with the event that occurs.

In addition, the user experiences the convenience of having to be involved in complex software operations to execute a function associated with the event that occurs in the background.

SUMMARY OF THE DISCLOSURE

Therefore, an aspect of the detailed description is to provide a mobile terminal that is capable of providing a user with an improved convenience of executing a function associated with an event that occurs with a web page being displayed on a display unit and a method of controlling the mobile terminal.

To achieve these and other advantages and in accordance with the purpose of this specification, as embodied and broadly described herein, there is provided a mobile terminal includes a display unit on which an address input window including address information on a web page is displayed, along with the web page, and a controller that monitors an event that occurs, and that controls the address input window in such a manner that the address input window is used in executing a function associated with the event that occurs, depending on whether or not the event occurs.

In the mobile terminal, in a state where the event does not occur, the controller may control the address input window in such a manner that the address input window is used in inputting the address information on the web page that is to be displayed on the display unit, and if the event occurs, the controller may control the address input window in such a manner that the address input window is used in executing the function associated with the event that occurs.

In the mobile terminal, when the address input window is no longer used in executing the function associated with the event that occurs, the controller may control the address input window in such a manner that the address input window is used in inputting the address information on the web page that is to be displayed on the display unit.

In the mobile terminal, when the address input window is no longer used in executing the function associated with the event that occurs, the controller may display the address information on the web page displayed on the display unit back to the address input window.

In the mobile terminal, if the event occurs, the controller may display an icon corresponding to the event that occurs, on one region adjacent to the address input window, and if the icon is selected, the controller may display a list including an item corresponding to at least one function associated with the event that occurs.

In the mobile terminal, the controller may execute the different functions associated with the event that occurs, depending on which one of the items included in the list is selected.

In the mobile terminal, if the icon is selected, the controller may enable a response message transmission mode to operate on the event that occurs, as the function associated with the event that occurs, and may display a virtual button into which a command for transmission of text information that is to be input into the address input window is input, on the display unit.

In the mobile terminal, if in a state where the address input window disappears from the display unit, the event occurs, the controller may display the address input window in the display unit in such a manner that the address input window is used in executing the function associated with the event that occurs.

In the mobile terminal, if the event occurs, the controller may control the address input window differently, depending on a type of touch input that is detected on the address input window.

In the mobile terminal, if a first touch input is detected on the address input window, the controller may control the address input window in such a manner that the address input window is used in inputting the address information on the web page that is to be displayed on the display unit, and if a second touch input different from the first touch input is detected on the address input window, the controller may control the address input window in such a manner that the address input window is used in executing the function associated with the event that occurs.

In the mobile terminal, the controller may display information associated with the event that occurs, on the address input window for a given time.

In the mobile terminal, if the information associated with the event that occurs, which is displayed on the address input window, is selected, the controller may control the address input window in such a manner that the address input window is used in executing the function associated with the event that occurs.

In the mobile terminal, if a touch input is detected on the address input window, the controller may displays a time line object having multiple time segments, on the address input window, and may displays object that correspond to the web pages, respectively, on the time line object, based on points in time that the web pages have been displayed.

In the mobile terminal, if any one of the objects is selected, the controller may detect the web page corresponding to the selected object and may display a preview screen of the detected web page on one region adjacent to the selected object.

In the mobile terminal, if a touch input is detected on the address input window, the controller may display at least one image included in the web page on the address input window.

In the mobile terminal, if any one of the multiple images included in the web page is selected, the controller may scroll through the web page in such a manner that a part on which the image is displayed on the web page is displayed on the upper end of the display unit.

To achieve these and other advantages and in accordance with the purpose of this specification, as embodied and broadly described herein, there is provided a method of controlling a mobile terminal including displaying an address input window including address information on a web page, along with the web page, monitoring an event that occurs, and controls the address input window in such a manner that the address input window is used in executing a function associated with the event that occurs, depending on whether or not the event occurs.

In the method of controlling a mobile terminal, the controlling of the address input window may include controlling the address input window in such a manner that the address input window is used in inputting the address information on the web page that is to be displayed on the display unit, in a state where the event does not occur, and controlling the address input window in such a manner that the address input window is used in executing the function associated with the event that occurs if the event occurs.

The method of controlling a mobile terminal may further include controlling the address input window in such a manner that the address input window is used in inputting the address information on the web page that is to be displayed on the display unit, when the address input window is no longer used in executing the function associated with the event that occurs.

In the method of controlling a mobile terminal, the controlling of the address input window may include controlling the address input window differently depending on a type of touch input that is detected on the address input window.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 4(a) to 11(d) are diagrams illustrating operational examples in which an address input window displayed along with a web page is used to execute a function associated with an event that occurs; and FIGS. 12(a) to 17(b) are diagrams illustrating operational examples in which the address input window displayed along with the web page is used to execute another function.

DETAILED DESCRIPTION OF THE DISCLOSURE

Hereinafter, the present disclosure will be explained in more detail with reference to the attached drawings. For the sake of brief description with reference to the drawings, the same or equivalent components will be provided with the same reference numbers, and description thereof will not be repeated.

A terminal in the present description may include a mobile terminal such as a portable phone, a smart phone, a notebook computer, a digital broadcasting terminal. Personal Digital Assistants (PDA), Portable Multimedia Player (PMP) and a navigator. However, it will be obvious to those skilled in the art that the present invention may be also applicable to a fixed terminal such as a digital TV and a desktop computer, except for specific configurations for mobility.

Figure 1:
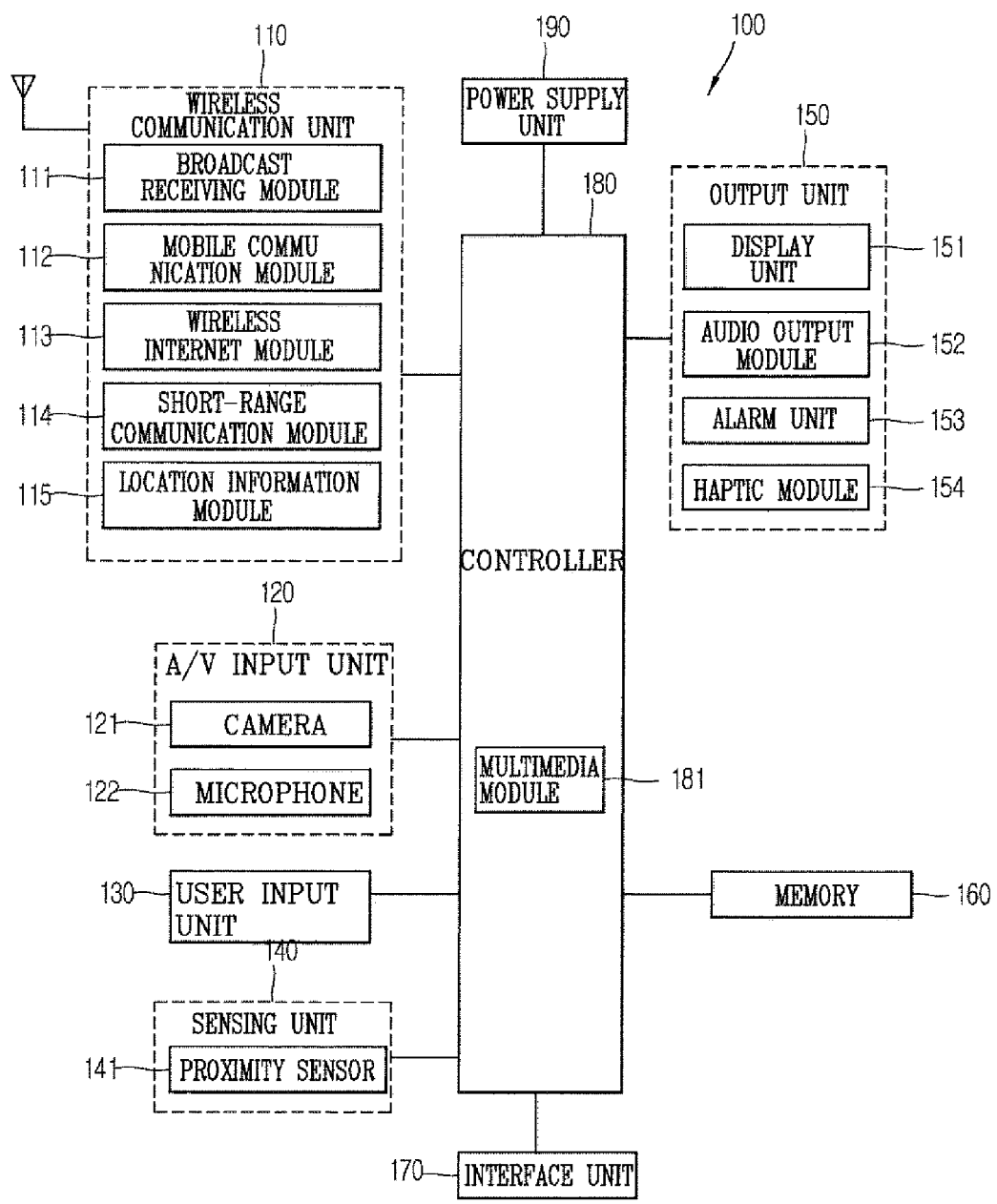
FIG. 1 is a block diagram illustrating a mobile terminal according to the present invention.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120 (hereinafter, will be referred to as 'user tracing unit), a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The user tracing unit 120 is configured to receive an audio or video signal, and to trace a user using the received signal. The user tracing unit 120 may include a camera 121, a microphone 122, an infrared ray sensor 123, etc. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. The sensing unit 140 may also include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

Here, if the display unit 151 and the touch sensor have a layered structure therebetween, the display unit 151 may be used as an input device rather than an output device. Such display unit 151 may be referred to as a 'touch screen'.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into the proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153 and a haptic module 154.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
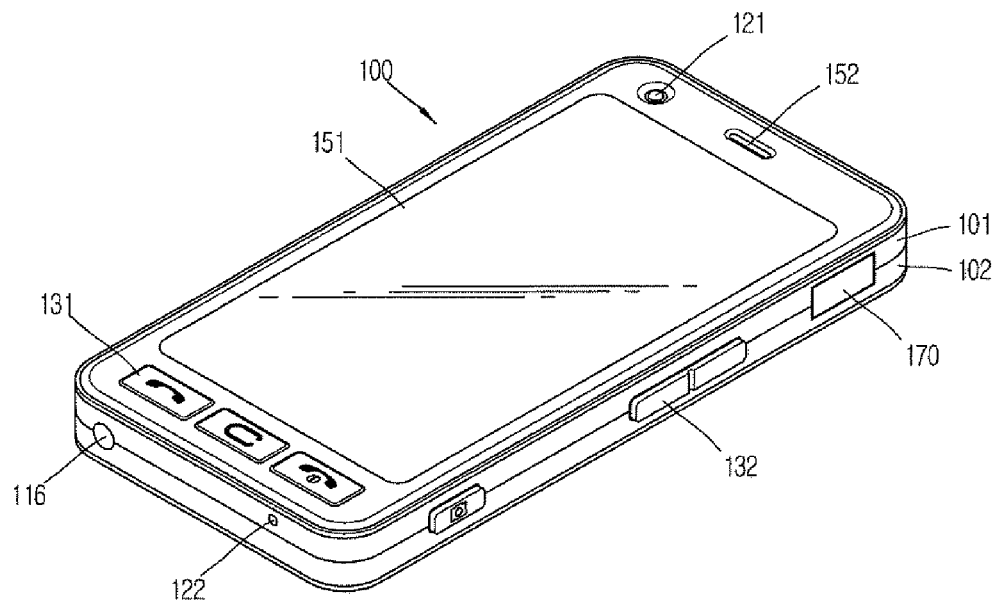
FIGS. 2A and 2B are perspective views, each illustrating an external appearance of the mobile terminal according to the present invention.
Figure 2B:
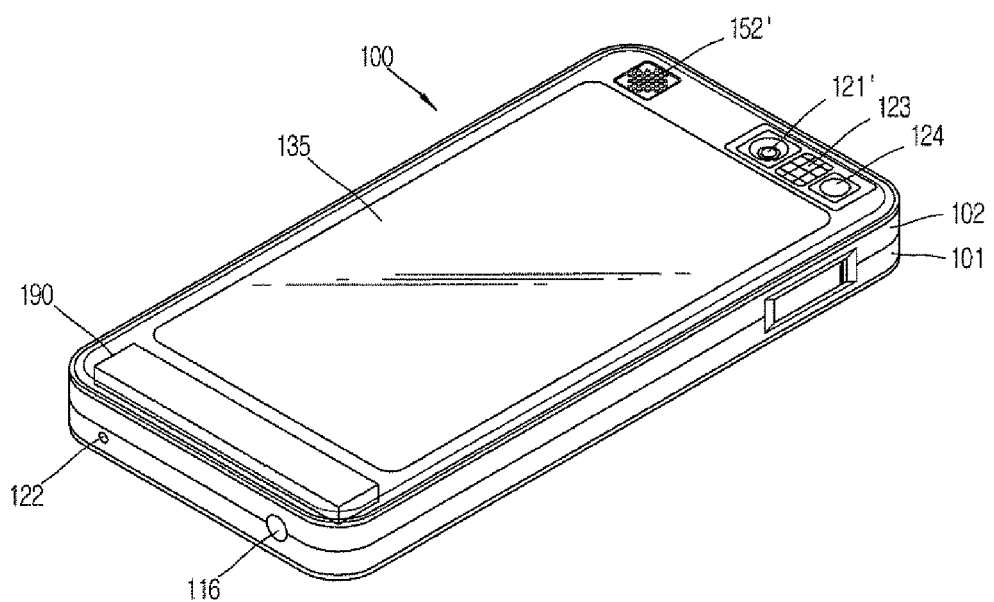

FIGS. 2A and 2B are perspective views showing the appearance of the mobile terminal 100 according to the present invention.

FIG. 2A is a view showing a front surface and one side surface of the mobile terminal 100 in accordance with the present invention, and FIG. 2B is a view showing a rear surface and another side surface of the mobile terminal 100 of FIG. 2A.

As shown in FIG. 2A, the mobile terminal 100 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 1), a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the terminal body. The audio output unit 152' may cooperate with the audio output unit 152 (refer to FIG. 2A) disposed on a front surface of the terminal body so as to implement a stereo function. Also, the audio output unit 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

On the other hand, the mobile terminal 100 executes a message application in the background while displaying a web page in the foreground.

However, if an event occurs in the background with the web page being displayed in the foreground, a user experiences the convenience of having to abandon viewing some part of the web page displayed in the foreground that is veiled to display information associated with the event that occurs. In addition, the user experiences the convenience of having to be involved in complex software operations to execute a function associated with the event that occurs in the background.

As a solution to such problems, the mobile terminal 100, capable of providing the user with an improved convenience of displaying the function associated with the event that occurs in the state where the web page is displayed on a display unit 151, and a method of controlling the mobile terminal 100 are described below referring to the accompanying drawings.

Figure 3:
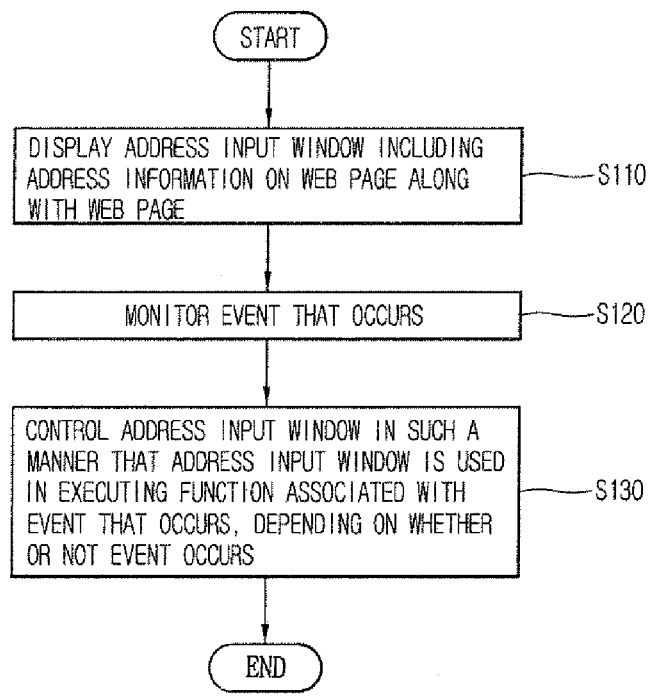
FIG. 3 is a flowchart for describing the mobile terminal according to one embodiment of the present invention.

FIG. 3 is a flowchart for describing the mobile terminal 100 (refer to FIG. 1) according to one embodiment of the present invention. The mobile terminal 100 includes the display unit 151 (refer to FIG. 1) and a controller 180 (refer to FIG. 1).

Referring to FIG. 3, first, Step S110 proceeds in which an address input window including address information on a web page is displayed on the display unit 151, along with the web page. Next, Step S120 proceeds in which the event that occurs is monitored.

The mobile terminal 100 executes a multitasking function. Multitasking allows multiple applications to run concurrently. Multiple applications are ones that are independent of one another, not ones that are linked to one another. That is, multitasking are not exclusively involved in executing a single application in a complementary manner, but means the capability of the mobile terminal to load multiple different independent applications into memory at one time and to run them concurrently.

The application here refers to any program that runs on the mobile terminal 100 to accomplish tasks such as assessing an on-line service, exchanging a message exchange, making a telephone call, photographing, and playing out video or audio files.

One example of the multitasking function is that the mobile terminal 100 displays the web page in the foreground. At this time, the event may occur in the background.

The web page is displayed on the display unit 151. Along with the web page, the address input window including the address information on the web page is displayed on the display unit 151. The address input window is used in inputting the address information on the web page that is to be displayed on the display unit 151.

The event includes an event associated with the application running in the background. In addition, the event includes an event not associated with the application running in the background, in which case the event occurs thereby running the associated application. The controller 180 monitors the events that occur in the background.

Subsequently, depending on whether or not the event occurs, Step S139 proceeds in which the address input window is controlled in such a manner that the address input window is used in executing a function associated with the event that occurs.

Specifically, in a state where the event does not occur, the controller 180 controls the address input window in such a manner that the address input window is used in inputting the address information on the web page that is to be displayed on the display unit 151. In contrast, if the event occurs, the controller 180 controls the address input window in such a manner that the address input window is used in executing the function associated with the event that occurs.

At this point, the information associated with the event that occurs is displayed on an indicator bar on the upper end of the display unit 151 or is displayed on the address input window.

When the address input window is no longer used in executing the function associated with the event that occurs, the controller 180 controls the address input window in such a manner that the address input window is used in inputting the address information on the web page as before. Along with this, the controller 180 displays the address information on the web page, displayed on the display unit 151 on the address input window as before.

For example, if in a state where the web page is displayed in the foreground a text message is received, the content of the received text message is displayed on the indicator bar. Subsequently, when transmitting a response message in response to the receive text message, the user can use the web page address input window. That is, the user can input the response message into the web page address input window.

Then, after transmitting the response message, the address information on the web page can be input into the address input window as before. In addition, after transmitting the web message, the address information on the web page, currently displayed on the display unit 151 is displayed on the address input window as before.

As described above, according to the present invention, if in a state where the web page is displayed in the foreground the text message is received, the content of the received text message is displayed on the indicator bar. As a result, the user can check the content of the received text message with the web page remaining unveiled.

In addition, according to the present invention, when executing a function associated with the received text message (for example, transmitting the response message), the user can write the response message with the web page being displayed, without involving the complex manipulation, by using the web page address input window. As a result, the user convenience can be improved.

Figure 4:
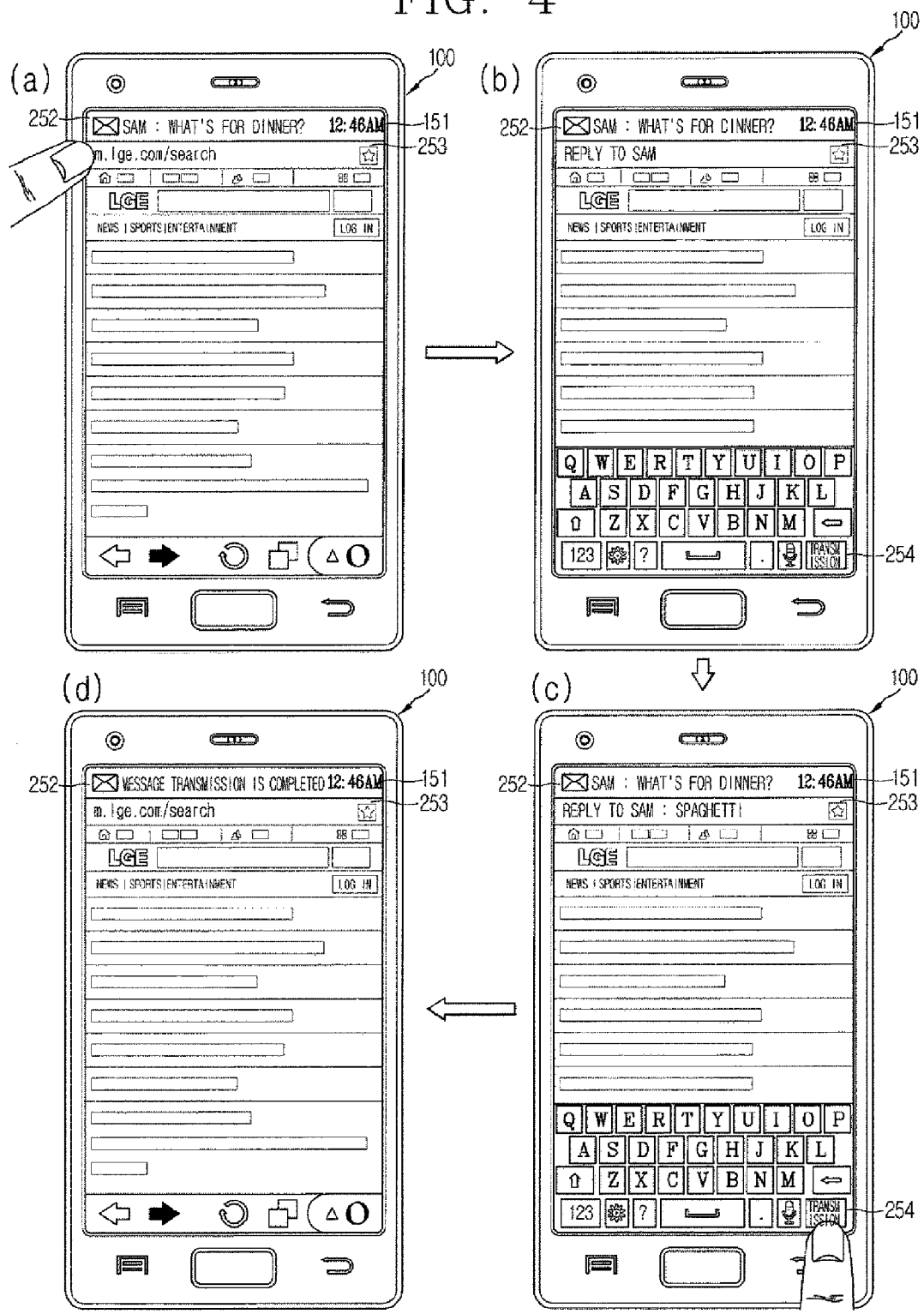

FIGS. 4(*a*) to 11(*d*) are diagrams illustrating operational examples in which the address input window 253 displayed along with the web page is used to execute the function associated with the event that occurs. The mobile terminal 100 includes the display unit 151 and the controller 180 (refer to FIG. 1).

FIGS. 4(*a*) and 4(*d*) are diagrams illustrating an operational example in which the address input window 253 displayed along with the web page is used to execute a function of transmitting the response message in response to the received text message.

Referring FIG. 4(a), along with the web page, the address input window 253 into which the address information on the web page is input is displayed on the display unit 151.

Along with this, the indicator bar 252 is displayed on the display 151. The indicator bar 252 displays the current date and time information. Although not illustrated, the indicator bar 252 displays an icon indicating current communication status information, an icon indicating information on the event that occurs, and others.

If the event occurs, for example, if the text message is received, the controller 180 displays the information associated with the received text message on the indicator bar 252. Accordingly, as illustrated, a name of a sender of the text message and the content of the text message are displayed on the indicator bar 252.

At this time, referring to FIG. 4(b), the controller 180 controls the address input window 253 in such a manner that the address input window 253 is used in executing the function associated with the event that occurs. For example, the controller 180 controls the address input window 253 in such a manner that the address input window 253 is used in transmitting the response message in response to the received text message. When this is done, as illustrated, the text information (for example, "REPLY TO SAM") that alerts "SAM" to a "response message" transmission mode is displayed on the address input window 253.

Along with this, the controller 180 displays a virtual keyboard. On the virtual keyboard, the controller 180 displays a virtual button (hereinafter referred to as a "transmission button") 254 into which a command to transmit the text information to be input into the address input window 253 is input. Although not illustrated, the transmission button 254 is displayed on one region adjacent to the address input window 253.

Subsequently, referring FIG. 4(c), if the user inputs the response message into the address input window 253 and touches on the transmission button 254, the controller 180 transmits the response message that is input by the user.

Referring to FIG. 4(d), after transmitting the response message to the other party, the text information indicating the message transmission completion (for example, "MESSAGE TRANSMISSION IS COMPLETED") is displayed on the indicator bar 252.

In addition, the controller 180 controls the address input window 253 in such a manner that the address input window 253 is used in inputting the address information on the web page as before. Along with this, the address information on the web page, currently displayed on the display unit 151 is displayed on the address input window 253 as before.

FIGS. 5(a) to 5(c) and FIGS. 6(a) and 6(b) are diagrams illustrating operational examples in which, when executing a function of transmitting the response message in response to the received message, a type of response message and a receiver of the response message are selected from the address input window 253 displayed along with the web page.

Figure 5:
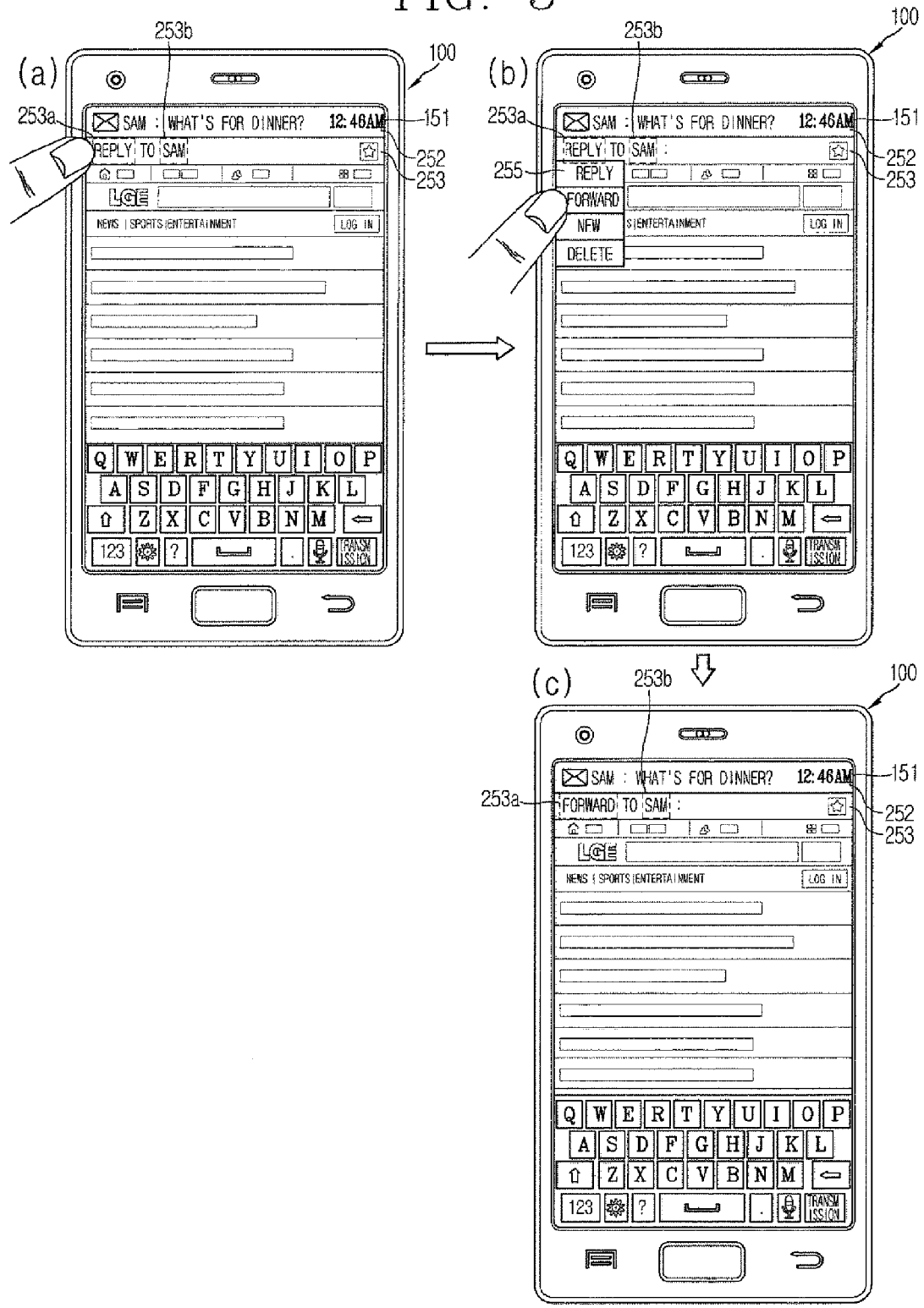
Figure 6:
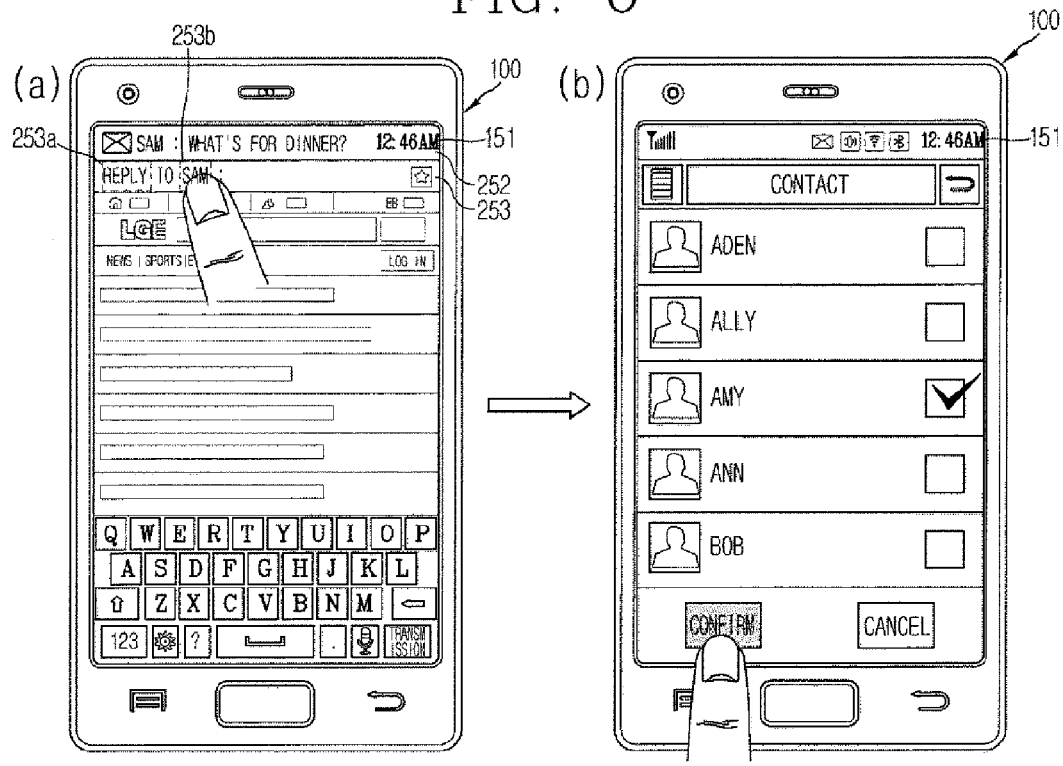

Referring FIG. 5(a) and FIG. 6(a), along with the web page, the address input window 253 into which the address information on the web page is input is displayed on the display unit 151.

At this time, if the event occurs, for example, if the text message is received, the controller 180, as illustrated, displays the name of the sender of the text message and the content of the text message on the indicator bar 252.

In addition, the controller 180 controls the address input window 253 in such a manner that the address input window 253 is used in transmitting the response message in response to the received text message. When this is done, as illustrated, the text information (for example, "REPLY TO SAM") that alerts "SAM" to a "response message" transmission mode is displayed on the address input window 253.

At this time, if "REPLY" 253a is touched on out of the text information displayed on the address input window 253, the controller 180, as illustrated in FIG. 5(b), displays a list 255, including various types of response message items, from which to select the type of response message. If one item (for example, "FORWARD") is selected from the list 255, the controller 180, as illustrated in FIG. 5(c), controls the address input window 253 in such a manner that the address input window 253 is used in transmitting a forwarding-target message in response to the received text message. When this is done, as illustrated, the text information (for example, "FOWARD TO SAM") that alerts "SAM" to a "forwarding-target message" transmission mode is displayed on the address input window 253.

On the other hand, if "SAM" 253b is touched on out of the text information displayed on the address input window 253, the controller 180, as illustrated in FIG. 6(b), displays a contact information list 255, including items of contact information, from which to select a receiver of the response message.

Subsequently, if at least one item of contact information (for example, "AMY") is selected from the contact information list, the controller 180 controls the address input window 253 in such a manner that the address input window 253 is used in transmitting the response message to the other party end corresponding to the selected item of contact information. When this is done, although not illustrated, the text information (for example, "REPLY TO AMY") that alerts "AMY" to the "response message" transmission mode is displayed on the address input window 253.

FIGS. 7(a) to 7(c) and FIGS. 8(a) to 8(d) are diagrams illustrating operational examples in which, when the event occurs, an icon corresponding to the event that occurs is displayed on the display unit 151.

Figure 7:
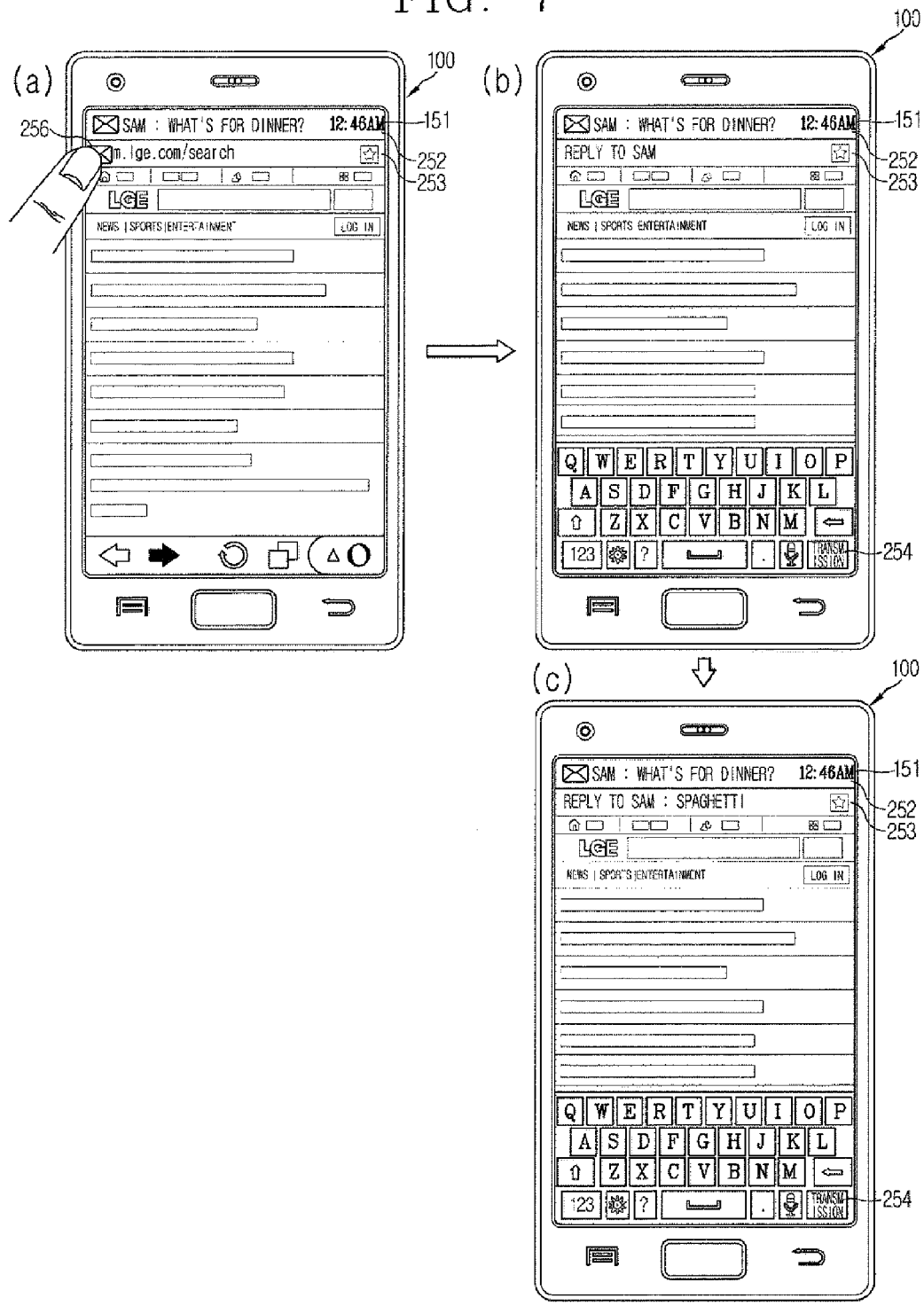
Figure 8:
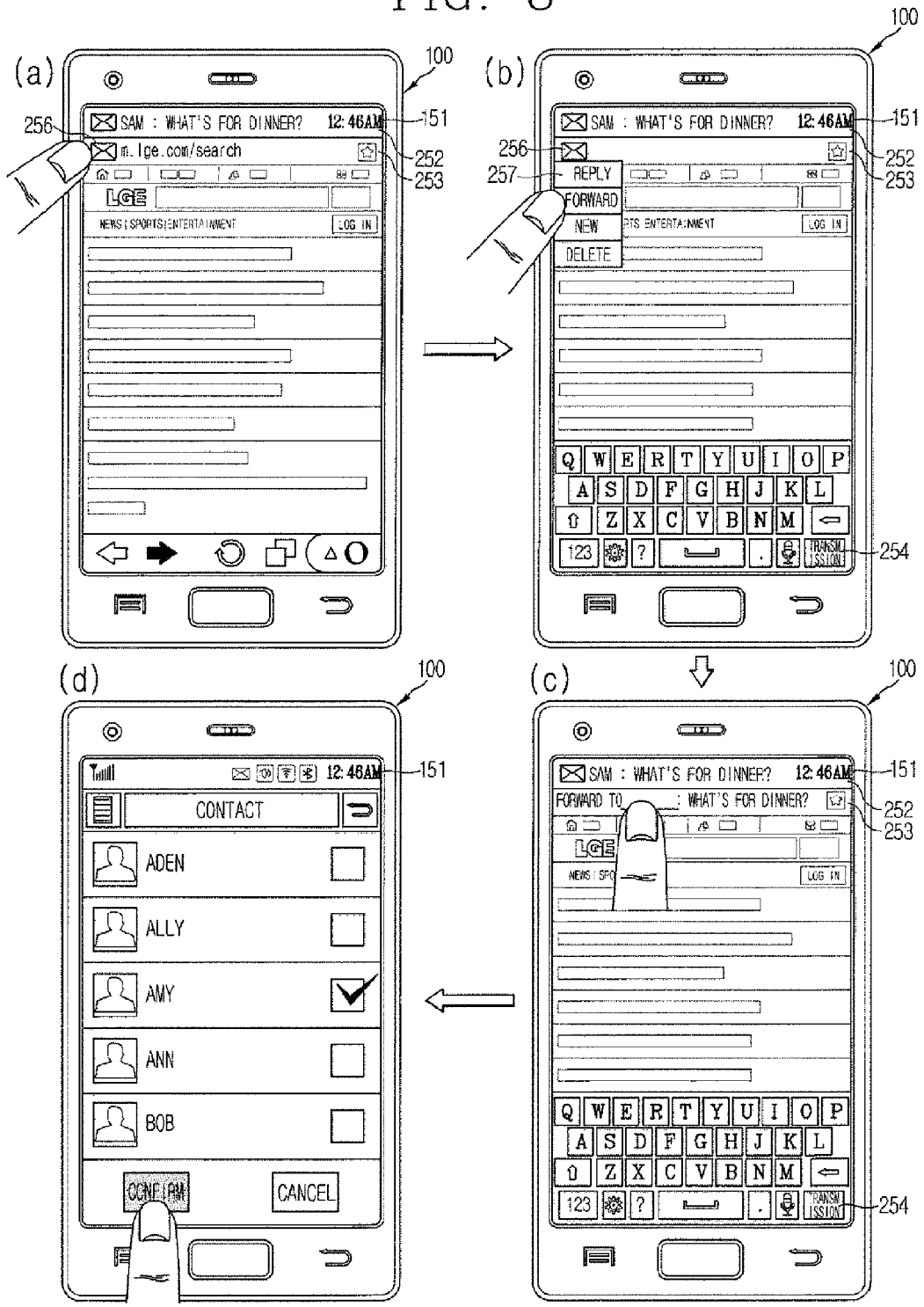

Referring to FIG. 7(a) and FIG. 8(a), along with the web page, the address input window 253 into which the address information on the web page is input is displayed on the display unit 151.

At this time, if the event occurs, for example, if the text message is received, the controller 180, as illustrated, displays the name of the sender of the text message and the content of the text message on the indicator bar 252. Along with this, the controller 180 displays an icon 256 indicating the text message reception completion on the address input window 253.

Although not illustrated, the icon 256 is displayed on one region adjacent to the address input window 253. In addition, although not illustrated, the icon 256 is displayed in such a manner as to overlap with the web page. In this case, the icon 256 is displayed in a transparent or translucent state in order to prevent the icon 256 from veiling the content of the web page.

Referring to FIGS. 7(b) and 7(c), if the icon 256 is selected, controller 180 controls the address input window 253 in such a manner that the address input window 253 is used in transmitting the response message in response to the received text message. When this is done, as illustrated, the text information (for example, "REPLY TO SAM") that alerts "SAM" to the "response message" transmission mode is displayed on the address input window 253.

At this time, as illustrated, the icon 256 disappears from the display unit 151. Although not illustrated, the icon 256 continues to be displayed on the display unit 151 until the response message is transmitted.

On the other hand, referring FIG. 8(b), if the icon 256 is selected, the controller 180 displays a list 257 including various types of response message items, from which to select the type of the response message.

In addition, on the virtual keyboard, the controller 180 displays the virtual button (hereinafter referred to as the "transmission button") 254 into which the command to transmit the text information, as the response, to be input into the address input window 253 is input.

If one item (for example, "FORWARD") is selected from the list 257, the controller 180, as illustrated in FIG. 8(c), controls the address input window 253 in such a manner that the address input window 253 is used in transmitting the message to be forwarded in response to the received text message. When this is done, as illustrated, the text information (for example, "FOWARD TO") indicating the "forwarding-target message" transmission mode is displayed on the address input window 253.

Next, if one region of the address input window 253 is selected, the controller 180, as illustrated in FIG. 8(d), displays the contact information list including the items of contact information, from which to select the receiver of the forwarding-target message on the address input window 253.

Subsequently, if at least one item of contact information (for example, "AMY") is selected from the contact information list, the controller 180 controls the address input window 253 in such a manner that the address input window 253 is used in transmitting the forwarding-target message to the other party corresponding to the selected item of contact information. When this is done, although not illustrated, the text information (for example, "FORWARD TO AMY") that alerts "AMY" to the "forwarding-target message" transmission mode is displayed on the address input window 253.

FIGS. 9(a) to 9(d) are diagrams illustrating an operational example in which, when the event occurs, the icon corresponding to the event that occurs is displayed on the display unit 151.

Figure 9:
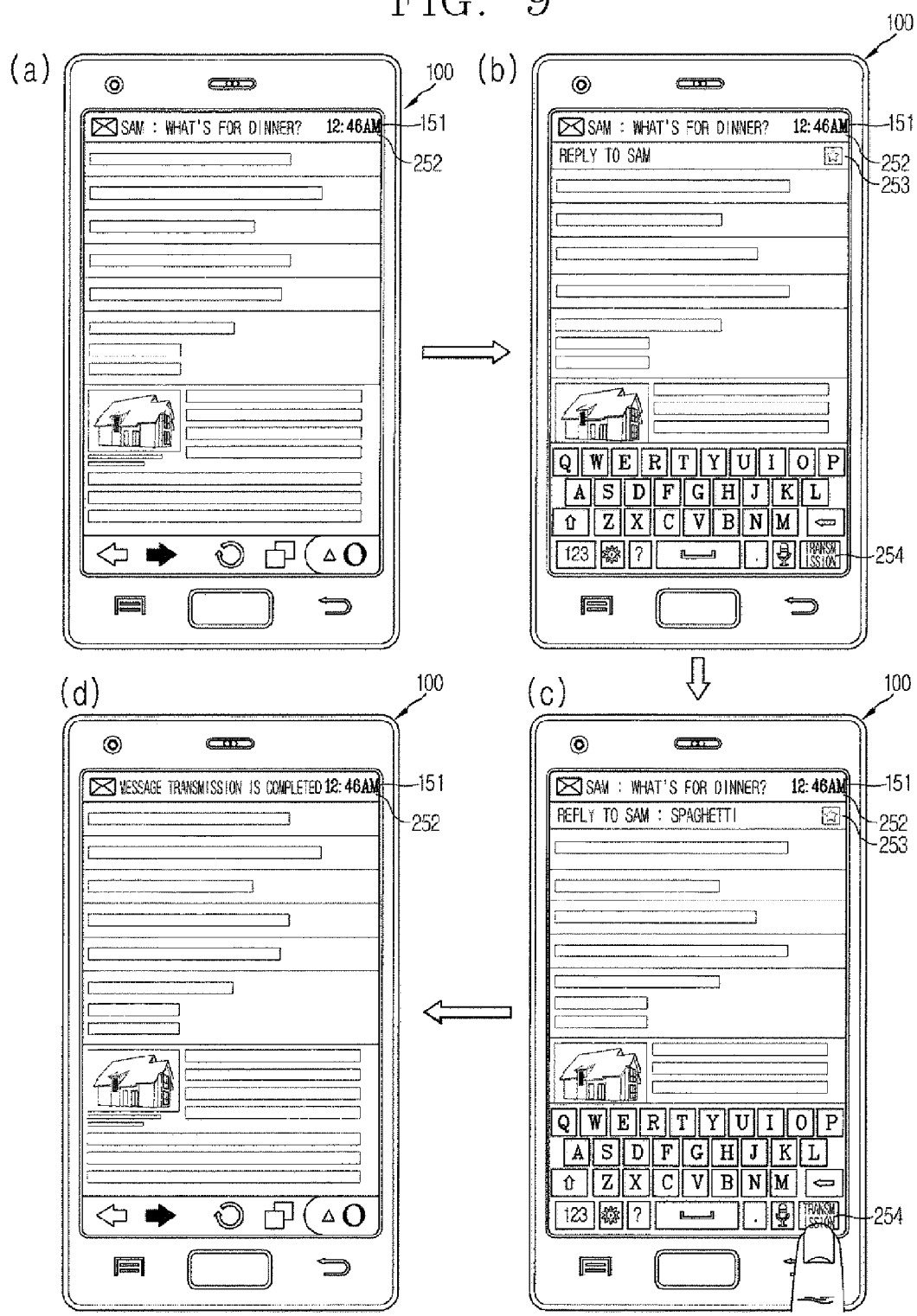

Referring to FIG. 9(a), the web page is displayed on the display unit 151. When, as the web page is scrolled through, the upper end of the web page is not displayed on the display unit 151, the address input window into which the address information on the web page is input is also not displayed on the display unit 151.

At this time, if the event occurs, for example, if the text message is received, the controller 180, as illustrated, displays the name of the sender of the text message and the content of the text message on the indicator bar 252.

Then, the controller 180, as illustrated in FIG. 9(b), displays the address input window 253 on the display unit 151 in such a manner that the address input window 253 is used in transmitting the response message in response to the received text message.

At this time, the address input window 253, as illustrated, is displayed on the web page currently displayed on the display unit 151. On the other hand, although not illustrated, the controller 180 automatically scrolls through the web page in such a manner that the upper end of the web page and the address input window 253 is displayed on the display unit 151.

Subsequently, the user, illustrated in FIG. 9(c), can input the text information into the address input window 253 by using the virtual keyboard.

Figure 10:
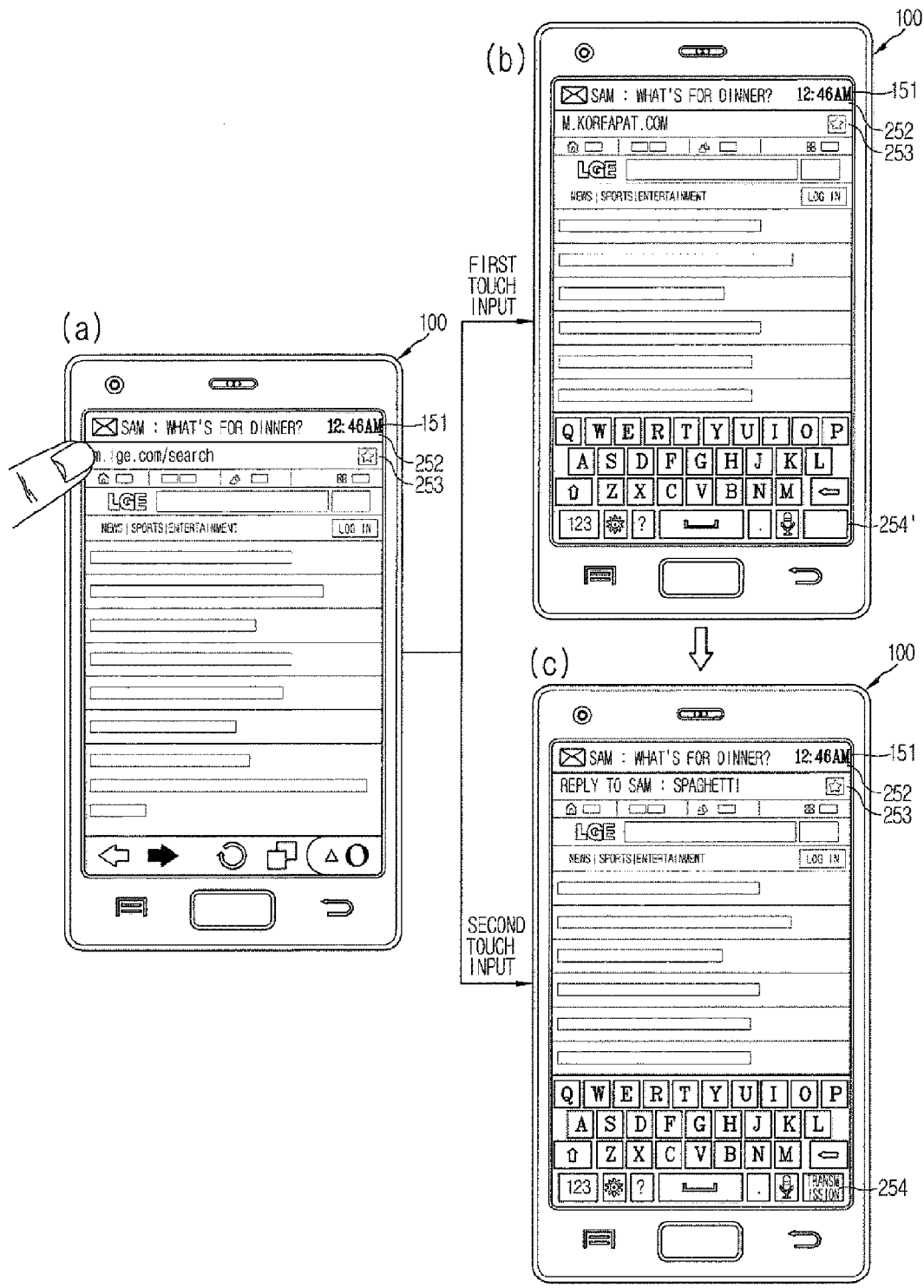

Subsequently, if the transmission button 254 displayed on the virtual keyboard is touched on, the controller 180, as illustrated in FIG. 9(d), transmits the response message. Along with this, the controller 180 displays the text information indicating the message transmission completion (for example, "MESSAGE TRANSMISSION IS COMPLETED") on the indicator bar 252. In addition, the controller 180 makes the address input window 253 disappear from the display unit 151. FIGS. 10(a) to 10(c) are diagrams illustrating an operational example in which the address input window 253 is differently controlled depending on a type of touch input detected on the address input window 253.

Referring to FIG. 10(a), the web page is displayed on the display unit 151. If the event occurs, for example, if the text message is received, the controller 180, as illustrated, displays the name of the sender of the text message and the content of the text message on the indicator bar 252.

At this time, if a first touch input is detected on the address input window 253, the controller 180, illustrated in FIG. 10(b), controls the address input window 253 in such a manner that the address input window 253 is used in inputting the address information on the web page that is to be displayed on the display unit 151.

That is, if the first touch input is detected on the address input window 253, the address input window 253 is used in inputting the address information on the web page, regardless of whether or not the event occurs.

At this time, on the virtual keyboard, the controller 180 displays a virtual button (hereinafter referred to as a "movement button") 254' into which a command for movement to the web page corresponding to the address information on the web page to be input into the address input window 253 is input.

On the other hand, if a second touch input different from the first touch input is detected on the address input window 253, the controller 180, illustrated in FIG. 10(c), controls the address input window 253 in such a manner that the address input window 253 is used in transmitting the response message in response to the received text message.

At this time, on the virtual keyboard, the controller 180 displays the virtual button (hereinafter referred to as the "transmission button") 254 into which the command to transmit the text information, as the response message to be input into the address input window 253 is input.

Although not illustrated, if the transmission button 254 is touched on for the transmission of the text information, the controller 180 controls the address input window 253 in such a manner that the address input window 253 is used in inputting the address information on the web page.

Figure 11:
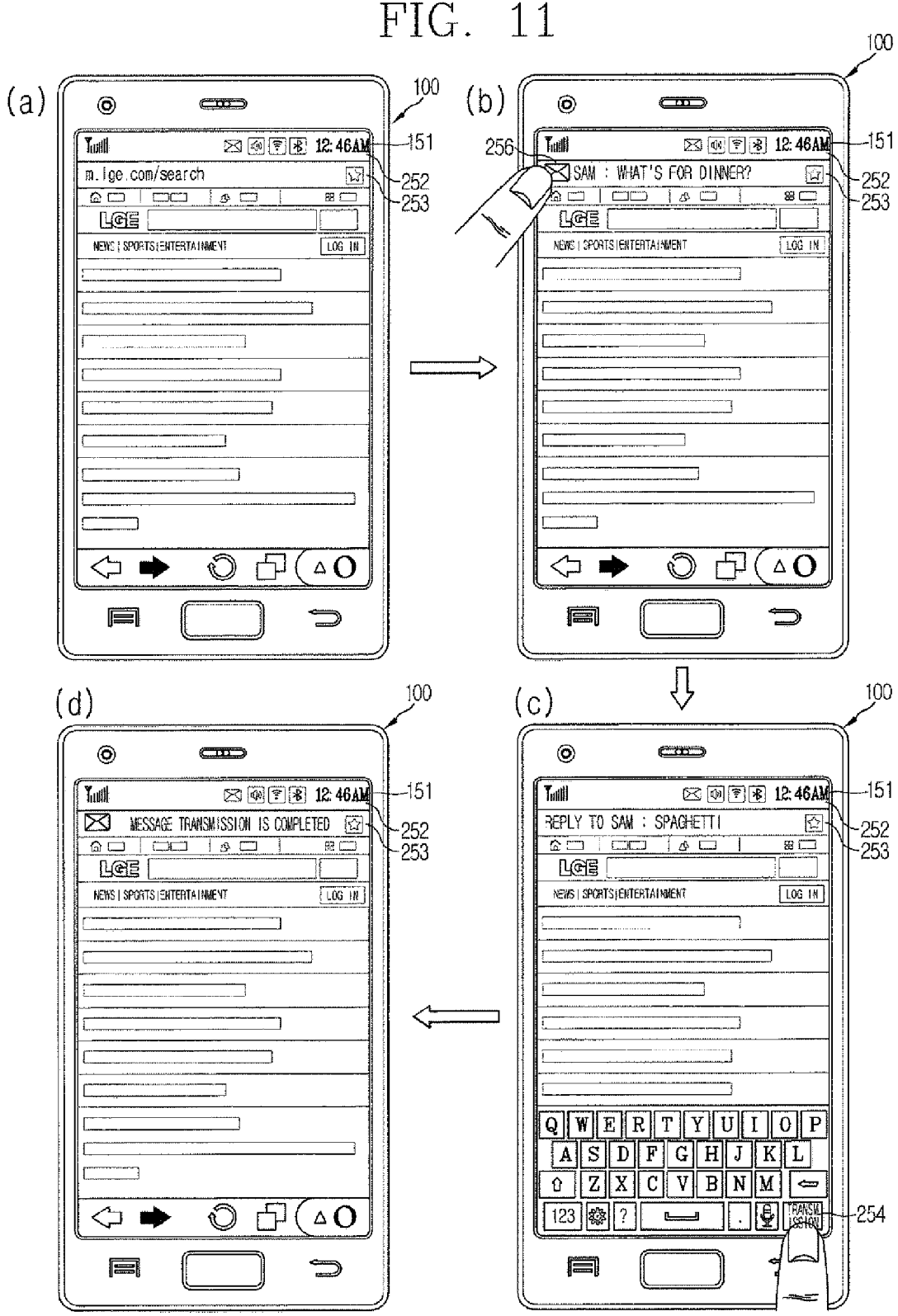
Figure 12:
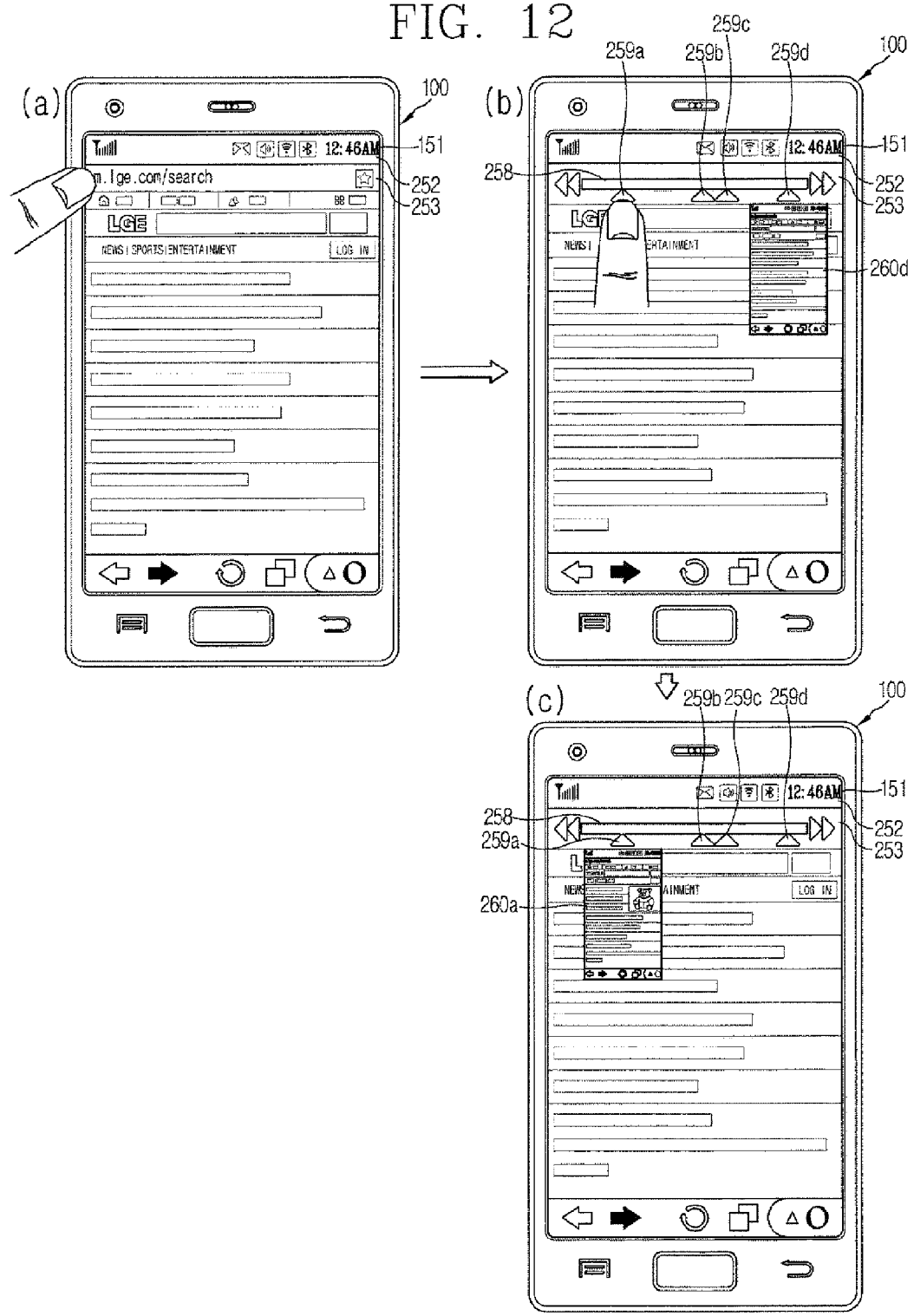
Figure 13:
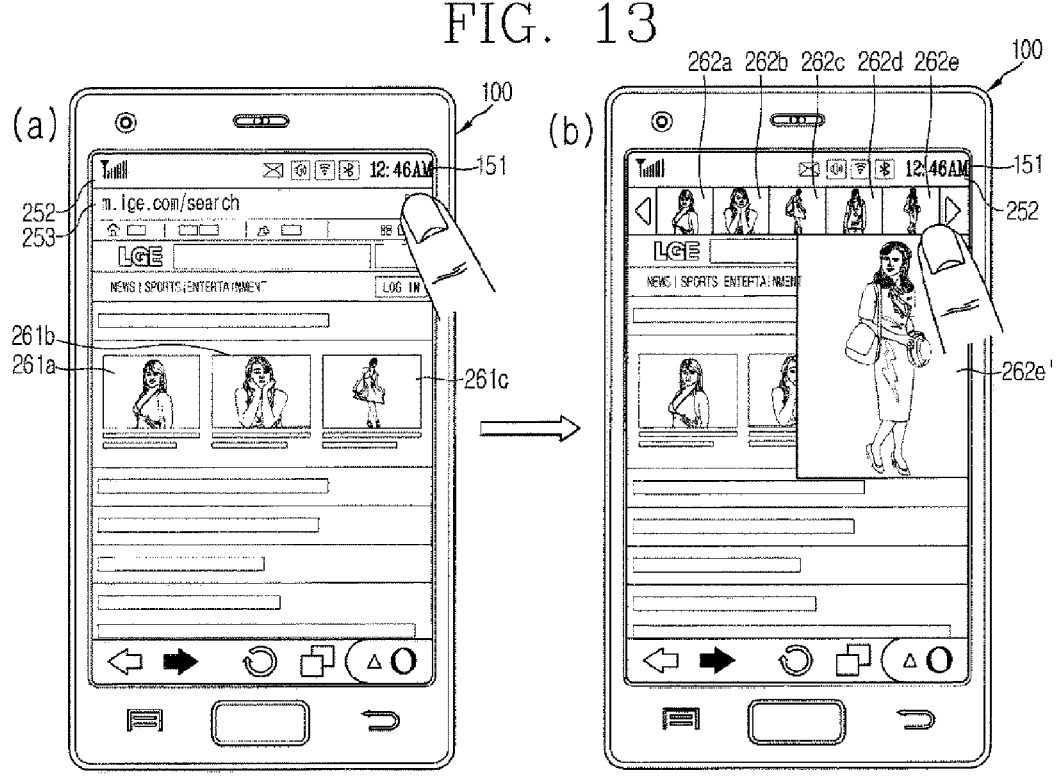
Figure 14:
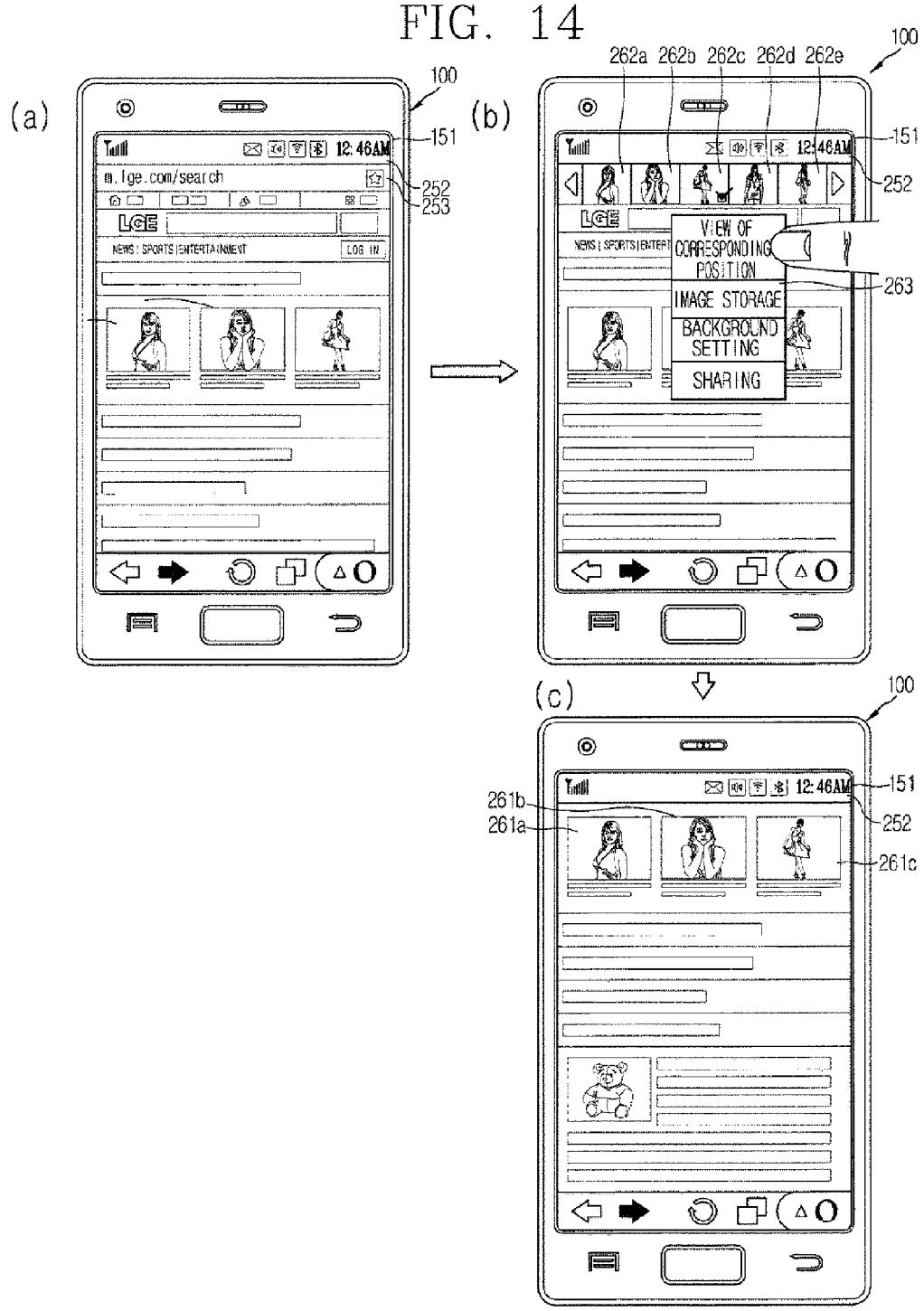
Figure 15:
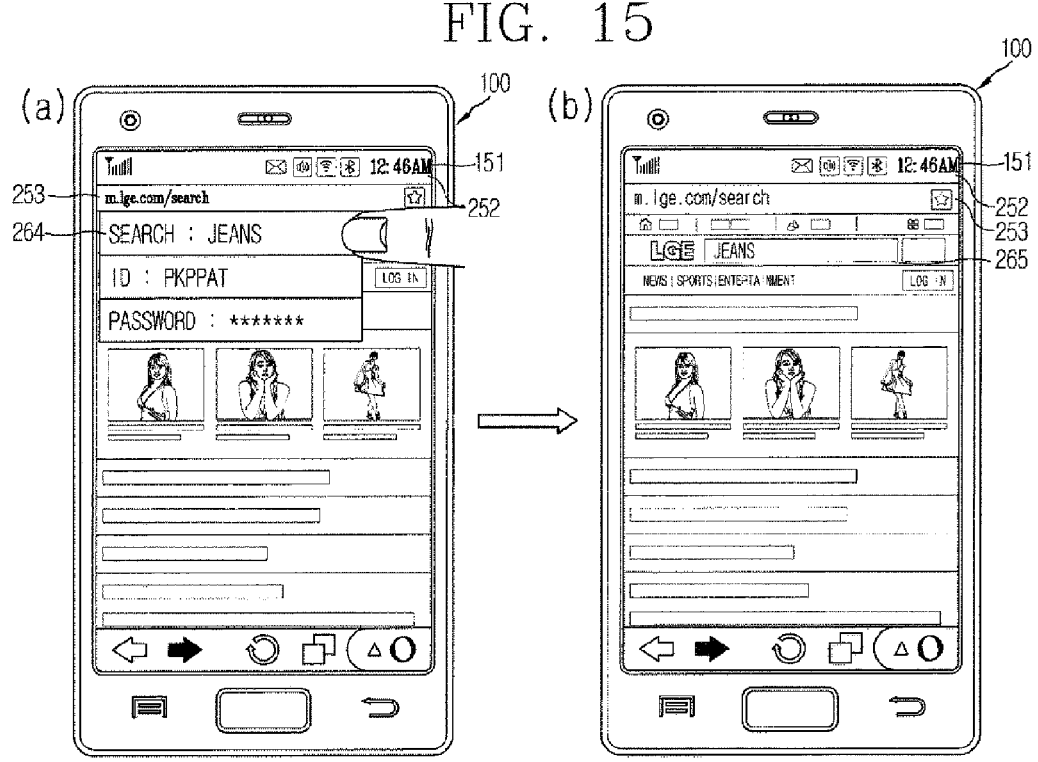
Figure 16:
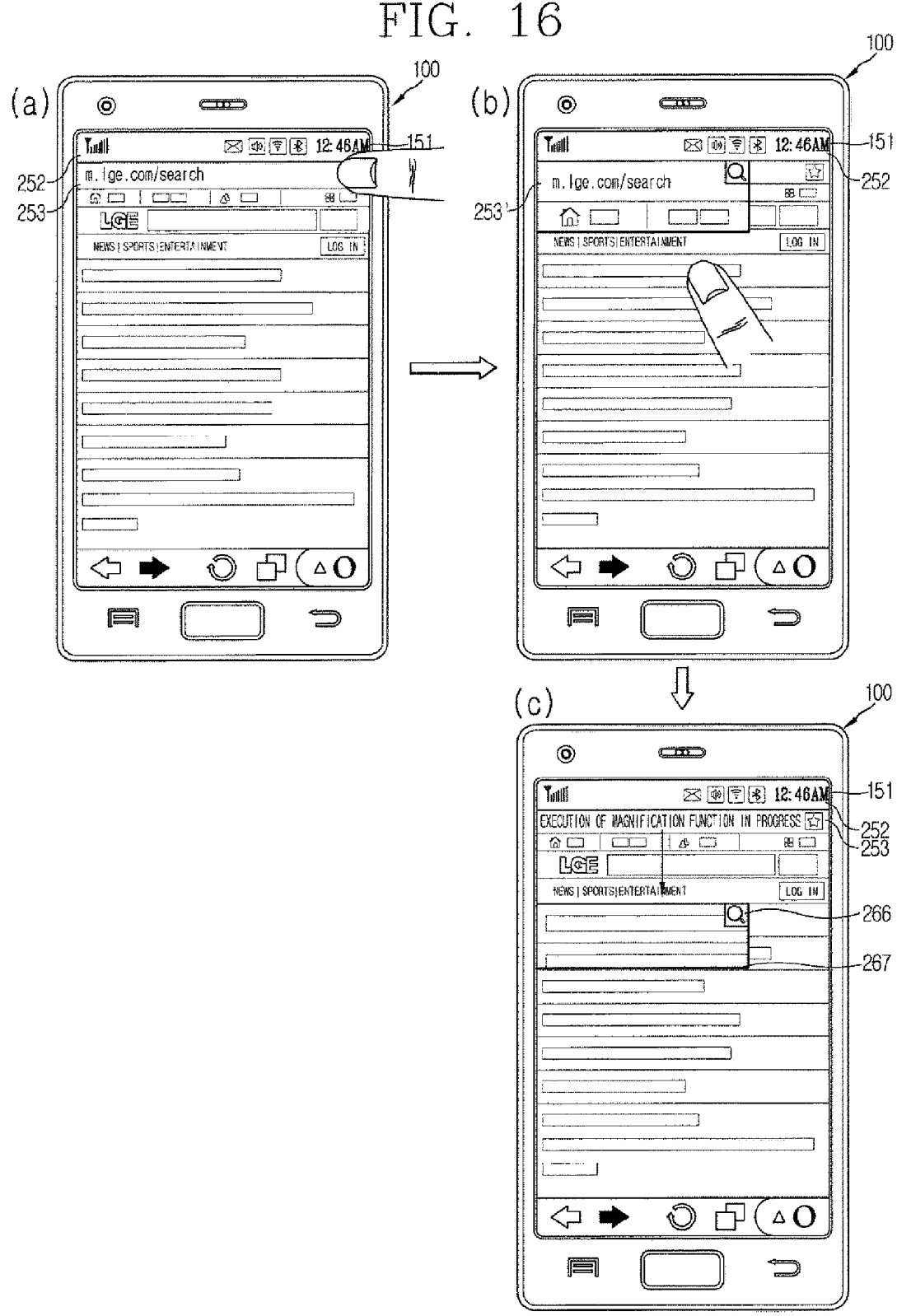

FIGS. 11(a) to 11(d) are diagrams illustrating an operational example in which the information associated with the event that occurs is displayed. Referring to FIG. 11(a), the web page is displayed on the display unit 151. Along with the web page, the address input window 253 including the address information on the web page is displayed on the display unit 151.

At this time, if the event occurs, for example, of the text message is received, the controller 180, as illustrated in FIG. 11(b), displays the information associated with the received text message on the address input window 253 for a given time. For example, the controller 180 displays the name of the sender of the text message and the content of the text message on the address input window 253. Along with this, the controller 180 displays an icon 256 indicating the text message reception completion on the address input window 253.

The icon 256 is selected, or if one region of the address input window 253 is touched on, the controller 180, illustrated in FIG. 11(c), controls the address input window 253 in such a manner that the address input window 253 is used in transmitting the response message in response to the received text message.

If the icon 256 is not touched for a given time, or if one region of the address input window 253 is not touched for the given time, the controller 180 makes the information associated with the text message displayed on the address input window 253 disappear and displays the address information corresponding to the web page displayed on the display unit 151 back on the address input window 253.

Subsequently, if the response message is transmitted, the controller 180, as illustrated in FIG. 11(d), displays the text information indicating the message transmission completion (for example, "MESSAGE TRANSMISSION IS COMPLETED") on the address input window 253 for a given time.

After the given time elapses, the controller 180 makes the text information indicating the message transmission completion displayed on the address input window 253 disappear, and displays the address information on the web page, displayed on the display unit 141 back to the address input window 253.

FIGS. 12(a) to 17(b) are diagrams illustrating operational examples in which the address input window 253 displayed along with the web page is used to execute another function. The mobile terminal 100 includes the display unit 151 and the controller 180 (refer to FIG. 1).

FIGS. 12(a) to 12(c) are diagrams illustrating an operational example in which the address input window 253 displayed along with the web page is used to display a time line object 258 having multiple time segments.

Referring FIG. 12(a), along with the web page, the address input window 253 into which the address information on the web page is input is displayed on the display unit 151.

At this time, if the touch input is detected on the address input window 253, the controller 180, as illustrated in FIG. 12(b), displays the time line object 258 having the multiple time segment, on the address input window 253.

The time line object 258 includes the multiple time segments, date and time information, and the like. The multiple time segments represent given units of time (for example, 20 minutes, one hour, and the like), and this representation is set according to an user input. For example, as illustrated, the multiple time segments represent units of time according to points in time the web pages have been displayed on the display unit 151.

The time line object 258 may be partly displayed due to limitation to the screen size of the display unit 151. In this case, the time line object 258 is controlled in such a manner that according to the touch input such as a flick input, an already-displayed part of the time line object 258 disappears at least partly and a different non-displayed part is displayed at least partly. The time line object 258, as illustrated in FIG. 12(b), includes the multiple objects 259a to 259d. Objects 259a to 259d correspond to the multiple time segments (for example, different points in time that the web pages have been displayed, respectively. Then, a preview screen 260d of the web page corresponding to the currently-selected object (for example, an object corresponding to the web page currently displayed on the display unit 151) 259d is displayed on one region adjacent to the currently-selected object 259d.

Subsequently, if the different one 259a, as illustrated in FIG. 12(c), is selected from the objects 259a to 259d, the controller 180 detects the web page corresponding to the selected object 259a, and displays a preview screen 260a of the detected web page on one region adjacent to the selected object 259a. Although not illustrated, if the preview screen 260a of the detected web page is selected, the controller 180 displays the web page corresponding to the selected preview screen 260a on the display unit 151. Accordingly, the address information on the web page, displayed on the address input window 253 is changed.

Although not illustrated, the time line object 258 includes the multiple objects, and the objects correspond to the multiple web pages and execution screens of the application that are displayed (or operated) currently in the foreground and in the background. In this case, if the object is selected, the web page or the preview screen of the execution screen of the application that corresponds to the selected object is displayed on one region adjacent to the selected object. Even though in the drawings, the preview screens that correspond to the multiple objects 259a to 259d, respectively, are displayed on one region adjacent to the time line object 258, if the user applies an arbitrary drag input to the display unit 151, the preview screens are displayed along a trace of the drag input.

FIGS. 13(a) and 13(b) and FIGS. 14(a) to 14(c) are diagrams illustrating operational examples in which the address input window 253 displayed along with the web page is used to display images included in the web image.

Referring FIG. 13(a) and FIG. 14(a), along with the web page, the address input window 253 into which the address information on the web page is input is displayed on the display unit 151.

At this time, if the touch input is detected on the address input window 253, the controller 180, illustrated in FIG. 13(b), displays the images 262a to 262e that correspond to the 261a to 261e included in the web page, respectively, displays the address input window 253.

At this time, if any one of the images 262a to 262e displayed on the address input window 253 is selected, the controller 180 displays an image 262e', which results from magnifying the selected image 262e, on one region adjacent to the selected image 262e.

On the other hand, referring to FIG. 14(b), if any one 262c of the images 262a to 262e displayed on the address input window 253 is selected, the controller 180 displays a list 263 including menu items for controlling the selected image 262c on the display unit 151.

Subsequently, if any one of the menu items (for example, an item "VIEW OF CORRESPONDING POSITION") is selected, the controller 180, as illustrated in FIG. 14(c), automatically scrolls through the web page in such a manner that a part on which the image 261c corresponding to the image 262c selected on the web page is displayed is displayed on the upper end of the display unit 151.

FIGS. 15(a) and 15(b) are diagrams illustrating an operational example in which the address input window 253 displayed along with the web page is used to display the images included in the web image.

Referring FIG. 15(a), along with the web page, the address input window 253 into which the address information on the web page is input is displayed on the display unit 151.

At this time, a text information list 264 designated with respect to the web page currently displayed on the display unit 151 is displayed on one region adjacent to the address input window 253. The text information includes at least one of a frequently-input key word, frequently input on the currently-displayed web page, an ID, and a password. In addition, the text information includes at least one of a keyword, which is most recently input, the ID, and the password.

On the other hand, at this time, the different list may be displayed on one region adjacent to the address input window 253. For example, thumbnail images of the web pages frequently visited may be displayed on one region adjacent to the address input window 253.

If any item (for example, the keyword) is selected from the text information list 264 displayed on the display unit 151, the controller 180, as illustrated in FIG. 15(b), enables the selected keyword to be input into a search window 265 on the web page currently displayed on the display unit 265.

Accordingly, the user can conduct a search through the use of the frequently-used keyword without having to input the frequently-used keyword directly into the search window 265.

FIGS. 16(a) and 16(c) are diagrams illustrating an operational example in which the address input window 253 displayed along with the web page is used to magnifying at least one part of the web page and displaying the result of this magnification.

Referring FIG. 16(a), along with the web page, the address input window 253 into which the address information on the web page is input is displayed on the display unit 151.

At this time, if a predetermined touch input is detected on the address input window 253, the controller 180, as illustrated in FIG. 16(b), executes a function of magnifying at least one part of the web page and displaying the result of this magnification (hereinafter referred to as a "magnification function").

Specifically, a first region including the address input window 253, as illustrated in FIG. 16(b), is magnified, and the magnified first region is displayed on a pop-up window 267. The pop-up window 267 may be displayed on the first region in such a manner as to overlap with the first region.

The user can change a position of the pop-up window 267 by applying the drag to the pop-up window 267. If the pop-up window 267 is moved in a direction of a second region, as illustrated in FIG. 16(c), the second region is magnified, and the magnified second region is displayed on the pop window 267.

At this time, as illustrated, a message, indicating that the function of magnifying at least one part of the web page and displaying the result of this magnification is being executed (for example, "EXECUTION OF MAGNIFICATION FUNCTION IN PROGRESS" is in progress), is displayed on the address input window 253. In addition, the icon 266, indicating that the function of magnifying at least one part of the web page and displaying the result of this magnification is being executed, is displayed also on the pop-up window 267.

Although not illustrated, the controller 180 executes a function of blurring at least one part of the web page and displaying the result of this blurring (hereinafter referred to as an "eraser function"). For example, if the eraser function is executed, a region of the web page selected by the user is obscurely displayed. Also, when the user subsequently displays the same web page on the display unit 151, the region selected by the user is obscurely displayed.

FIGS. 17(a) and 17(b) are diagrams illustrating an operational example in which the address input window 253 displayed along with the web page is used to execute the multitasking function.

Referring to FIGS. 17(a) and 17(b), if the text information (for example, a "subway linemap") corresponding to a name of content is input into the address input window 253 displayed on the display unit 151, the controller 180 selects the content, based on the text information that is input, and displays the selected content (for example, "SUBWAY LINEMAP") in the foreground.

While displaying the selected content 268 in the foreground, the controller 180 continues to display the text information corresponding to the name of the content displayed in the foreground on the address input window 253. Although not illustrated, if a given time elapses, the controller 180 makes the text information corresponding to the name of the content disappear from the address input window 253, and displays the address information on the web page, currently displayed on the display unit 151 back to the address input window 253.

On the other hand, although not illustrated, the controller 180 enables the text information corresponding to a name of the application to be input into the address input window 253. In this case, the controller 180 executes the application, based on the text information that is input. On the other hand, although not illustrated, the address input window 253 described above can be used to execute various functions. For example, the address input window 253 can be displayed in the shape of a three-dimensional image. The controller 180 changes the web page displayed on the display unit 151 to the different web page, based on the drag input applied in a specific direction to the address input window 253 displayed in the shape of a three-dimensional image. At this point, the different web pages are displayed on the display unit 151 depending on the direction in which the drag input is applied.

In addition, location information is input into the address input window 253. The controller 180 conducts at least one of a location search and a course search, by using the location information that is input, and information on a current location of the mobile terminal.

In addition, the text information is input into the address input window 253. The controller 180 may translate the text information that is input, into a specific language, and displayed the translated text information to the address input window 253. In addition, the controller 180 may display the web page on the display unit 151 for the translation of the text information that is input.

In addition, the address information on the web page, displayed on the address input window 253 may be separated into multiple regions. For example, "m.lge.com" is separated into "m", "lge", and "com". The controller 180 may change the address information on the web page, based on the touch input applied to each of the items of address information that results from the separation. In addition, effect information that is to be applied to the display unit 151 may be input into the address input window 253. For example, if the predetermined is detected on the address input window 253, the controller 180 displays the effect information that depends on current weather information, on the web page displayed on the display unit 151 in such a manner that the effect information overlaps with the web page. In addition, the controller 180 may display an image obtained by using a camera 121 (refer FIG. 1), on the web page in such a manner that the image overlaps with the web page.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

With regard to the mobile terminal described above, the configuration and method of the embodiments described above are not given any limitation to their applications, and all of, or some of the embodiments may be selectively combined with each other in a manner that creates various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a display; and
    a controller coupled to the display and configured to:
        execute a first application associated with a web page;
        cause the display to display the web page and an address input window in which address information corresponding to the displayed web page is displayed, wherein the web page and the address input window are displayed together;
        detect occurrence of an event while the web page is displayed, wherein the event is associated with a second application executable in the mobile terminal;
        cause the display to display content related to the event instead of the address information in the address input window while the web page is displayed when the occurrence of the event is detected;
        execute a function of the second application while the web page is displayed using information entered via the address input window; and
        cause the display to re-display the address information in the address input window following the execution of the function.

2. The mobile terminal of claim 1, wherein the event comprises receiving a new message.

3. The mobile terminal of claim 2, wherein the content related to the event that is displayed in the address input window comprises at least information about a sender of the new message.

4. The mobile terminal of claim 3, wherein the address information is re-displayed in the address input window without requiring a user input after the function is executed.

5. The mobile terminal of claim 4, wherein the controller is further configured to cause the display to display:
    an icon corresponding to the event proximate to the address input window; and
    a list comprising an item corresponding to the function associated with the event upon selection of the icon.

6. The mobile terminal of claim 5, wherein the controller is further configured to execute the function upon selection of the item.

7. The mobile terminal of claim 5, wherein the controller is further configured to:
    control a response message transmission mode associated with the new message; and
    cause the display to display a virtual button when controlling the response message transmission mode, wherein a response message is transmitted in response to an input received via the virtual button.

8. The mobile terminal of claim 1, wherein the controller is further configured to cause the display to terminate the displaying of the address input window before the event occurs.

9. The mobile terminal of claim 1, wherein the controller is further configured to control the address input window differently based on the information entered after the event occurs.

10. The mobile terminal of claim 9, wherein the controller is further configured to control the address input window to:
    receive the information upon selection of a first input option; and
    receive an input comprising the address information upon selection of a second input option.

11. The mobile terminal of claim 1, wherein the content related to the event is displayed in the address input window for a predetermined time period such that the address information is re-displayed in the address input window when no input is received within the predetermined time period while the content is displayed.

12. The mobile terminal of claim 11, wherein the controller is further configured to execute the function when a touch input is applied via the address input window while the content is displayed in the address input window.

13. The mobile terminal of claim 1, wherein the controller is further configured to cause the display to display;
    a time line object comprising multiple time segments on the address input window; and
    one or more objects corresponding to the web page on the time line object based on points in time that the web page has been displayed.

14. The mobile terminal of claim 13, wherein the controller is further configured to:
    detect the web page corresponding to a first object; and
    cause the display to display a preview screen of the detected web page on a first region adjacent to the first object.

15. The mobile terminal of claim 1, wherein the controller is further configured to cause the display to display at least one image included in the web page on the address input window.

16. The mobile terminal of claim 15, wherein the controller is further configured to cause the display to display one or more images located on the web page on a first region proximate to the top of the display.

17. A method of controlling a mobile terminal, the method comprising:
    displaying a web page and an address input window in which address information corresponding to the displayed web page is displayed, wherein the web page is associated with a first application being executed at the mobile terminal, and wherein the web page and the address input window are displayed together;
    detecting occurrence of an event while the web page is displayed, wherein the event is associated with a second application executable in the mobile terminal;
    displaying content related to the event instead of the address information in the address input window while the web page is displayed when the occurrence of the event is detected;
    executing a function of the second application while the web page is displayed using information entered via the address input window; and
    re-displaying the address information in the address input window following the execution of the function.

18. The method of claim 17, wherein:

the event comprises receiving a new message; and the content related to the event that is displayed in the address input window comprises at least information about a sender of the new message.

19. The method of claim 17, further comprising:

controlling the address input window to receive an input comprising address information via the address input window after the function has been executed.

20. The method of claim 17, further comprising:

receiving a touch input; and configuring the address input window to receive first address information or the information based on the received touch input.

\* \* \* \* \*